United States Patent
Bhandari et al.

(10) Patent No.: US 9,820,178 B2
(45) Date of Patent: Nov. 14, 2017

(54) SYSTEM AND METHOD FOR LAYER 3 RING PROTECTION WITH ADAPTIVE BANDWIDTH MICROWAVE LINKS IN A NETWORK ENVIRONMENT

(71) Applicant: CISCO TECHNOLOGY, INC., San Jose, CA (US)

(72) Inventors: Shwetha Subray Bhandari, Bangalore (IN); Samer Salam, Vancouver (CA); Kannan Jayaraman, Bangalore (IN); Arvind Saproo, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 102 days.

(21) Appl. No.: 14/844,448

(22) Filed: Sep. 3, 2015

(65) Prior Publication Data

US 2015/0382229 A1    Dec. 31, 2015

Related U.S. Application Data

(62) Division of application No. 13/847,904, filed on Mar. 20, 2013, now Pat. No. 9,161,259.

(51) Int. Cl.
*H04W 28/02* (2009.01)
*H04W 24/02* (2009.01)
(Continued)

(52) U.S. Cl.
CPC ......... *H04W 28/0236* (2013.01); *H04L 45/02* (2013.01); *H04W 24/02* (2013.01); *H04W 40/12* (2013.01)

(58) Field of Classification Search
CPC .............................................. H04W 28/0236
See application file for complete search history.

(56) References Cited

U.S. PATENT DOCUMENTS 5,953,312 A   9/1999 Crawley et al.
6,574,280 B1  6/2003 Liau et al.
(Continued)

OTHER PUBLICATIONS

ITU-T G.8032/Y.1344 (Feb. 2012), "Series G: Transmission Systems and Media, Digital Systems and Networks Packet over Transport aspects—Ethernet over Transport aspects Series Y: Global Information Infrastructure, Internet Protocol Aspects and Next-Generation Networks Internet protocol aspects—Transport: Ethernet ring protection switching," International Telecommunication Unionn Telecommunication Strandardization Sector (ITU-T), Feb. 2012; Printed in Geneva, Switzerland; 104 pages.
(Continued)

*Primary Examiner* — Hassan Kizou
*Assistant Examiner* — Toan Nguyen

(57) ABSTRACT

A method is provided in one example and includes receiving a current bandwidth characteristic for a link, where the current bandwidth characteristic is determined under fading conditions associated with signal propagation on the link. The method can also include calculating a new cost for the link that is different from a nominal cost associated with a nominal bandwidth of the link without the fading conditions. The method could also include routing at least a portion of a plurality of flows that are to traverse the link away from the link based, at least in part, on the new cost. Another example method includes receiving the current bandwidth characteristic for the link, comparing the current bandwidth characteristic with a preconfigured low watermark corresponding to a class-specific MTR topology associated with a class of traffic traversing the link, and removing the link from the MTR topology based on the current bandwidth characteristic.

21 Claims, 10 Drawing Sheets

(51) Int. Cl.
*H04W 40/12* (2009.01)
*H04L 12/751* (2013.01)

(56) References Cited

U.S. PATENT DOCUMENTS

| | | | |
|---|---|---|---|
| 6,697,334 B1* | 2/2004 | Klincewicz | H04L 41/145 370/238 |
| 7,558,205 B1 | 7/2009 | Moncada-Elias et al. | |
| 9,161,259 B2 | 10/2015 | Bhandari et al. | |
| 9,392,526 B2 | 7/2016 | Gohite et al. | |
| 2002/0067693 A1 | 6/2002 | Kodialam et al. | |
| 2002/0186658 A1 | 12/2002 | Chiu et al. | |
| 2007/0070883 A1* | 3/2007 | Lysne | H04L 45/00 370/218 |
| 2007/0230346 A1* | 10/2007 | Yamada | H04L 41/5009 370/235 |
| 2009/0238067 A1 | 9/2009 | Yamouchi et al. | |
| 2010/0039935 A1 | 2/2010 | Davison | |
| 2010/0172238 A1 | 7/2010 | Saltsidis et al. | |
| 2011/0028146 A1 | 2/2011 | Tammisetti | |
| 2011/0080915 A1 | 4/2011 | Baykal et al. | |
| 2011/0164501 A1 | 7/2011 | Dunbar | |
| 2011/0164505 A1 | 7/2011 | Salam et al. | |
| 2012/0093002 A1 | 4/2012 | Osborne | |
| 2012/0140625 A1* | 6/2012 | Long | H04L 47/12 370/231 |
| 2013/0077559 A1 | 3/2013 | Nakagawa et al. | |
| 2013/0148494 A1* | 6/2013 | Abbas | H04L 47/746 370/225 |
| 2013/0201820 A1 | 8/2013 | Xiaoyong et al. | |
| 2014/0254347 A1 | 9/2014 | Xie et al. | |
| 2014/0341037 A1 | 11/2014 | Racz | |
| 2014/0355447 A1 | 12/2014 | Gohite et al. | |
| 2015/0055486 A1 | 2/2015 | Maggiari et al. | |
| 2015/0208260 A1 | 7/2015 | Ahlqvist et al. | |
| 2016/0286462 A1 | 9/2016 | Gohite et al. | |

OTHER PUBLICATIONS

ITU-T G.8013/Y.1731 Corrigendum 1 (Oct. 2011), :Series G; Transmission Systems and Media, Digital Systems and Networks, Packet over Transport Aspects—Ethernet over Transport Aspects; Series y: Global Information Infrastructure, Internet Protocol Aspects and Next-Generation Networks, Internet Protocol Aspects—Operation, Administration and Maintenance; OAM Functions and Mechanisms for Ethernet based networks, Corrigendum 1, International Telecommunication Union Telecommunication Standardization Sector (ITU-T), G.8013/Y.1731 Corrigendum 1, Oct. 2011, 12 pages.
ITU-T G.8013/Y.1731 Amendment 1 (May 2012), "Series G: Transmission Systems and Media, Digital Systems and Networks, Packet over Transport Aspects—Ethernet over Transport Aspects; Series &: Global Information Infrastructure, Internet Protocol Aspects and Next-Generation Networks, Internet Protocol Aspects—Operation, Administration and Maintenance; OAM functions and mechanism for Ethernet based networks Amendment 1," International Telecommunication Union Telecommunication Standardization Sector (ITU-T), G.8013/Y.1731 Corrigendum Amendment 1, May 2012, 16 pages.
Lakshman, Umesh, et al., "MPLS Traffic Engineering," Ciscopress. com, Jan. 13, 2006, http://www.ciscopress.com/articles/printerfriendly.asp?p=426640, 34 pages.
ITU-T G.808.1 (Feb. 2010) "Series G: Transmission Systems and Media, Digital Systems and Networks, Digital Networks—General Aspects; Generic protection switching—Linear trail and subnetwork protection," International Telecommunication Union Telecommunication Standardization Sector (ITU-T), G.808.1, Feb. 2010, 68 pages.
ITU-T G.808.1 Amendment 1 (Aug. 2012), "Series G: Transmission Systems and Media, Digital Systems and Networks, Digital Networks—General Aspects; Generic protection switching—Linear trail and subnetwork protection, Amendment 1," International Telecommunication Union Telecommunication Standardization Sector (ITU-T), G.808.1 Amendment 1, Aug. 2012, 14 pages.
ITU-T G.808.1 Amendment 2 (Sep. 2012) Series G: Transmission Systems and Media, Digital Systems and Networks, Digital Networks—General Aspects; Generic protection switching—Linear trail and subnetwork protection; Amendment 2: New Appendix VII—Solution for Service protection in dynamic bandwidth networks, International Telecommunication Union Telecommunication Standardization Sector (ITU-T), G.808.1 Amendment 2, Sep. 2012, 10 pages.
USPTO Oct. 2, 2013 Non-Final Office Action from U.S. Appl. No. 13/356,170.
USPTO Mar. 14, 2014 Final Office Action from U.S. Appl. No. 13/356,170.
USPTO Oct. 2, 2015 Final Office Action from U.S. Appl. No. 13/903,767.
U.S. Appl. No. 15/178,322, filed Jun. 9, 2016 entitled "Protection Against Fading in a Network Ring," Inventors: Pravin K. Gohite, et al.
USPTO Mar. 11, 2016 Notice of Allowance from U.S. Appl. No. 13/903,767.
USPTO Mar. 23, 2016 Final Office Action from U.S. Appl. No. 13/356,170.
USPTO Sep. 15, 2016 Final Office Action from U.S. Appl. No. 13/356,170.
U.S. Appl. No. 13/356,170, filed Jan. 23, 2013 entitled "System and Method for Ring Protection Switching Over Adaptive Modulation Microwave Links," Inventors: Samer M. Salam, et al.
Hao Long, et al., "Proposal on adding bandwidth degradation message in Y.1731," Telecommunication Standardized Sector Study Period 2009-2012, Huawei Technologies Co., Ltd., May 2010; 5 pages.
Stan Kurkovsky, "Computer Networks Routing Algorithms," Based on Computer Networking, 4th Edition by Kurose and Ross, [retrieved and printed Dec. 12, 2012], 11 pages; http://www.cs.ccsu.edut/~stan/classes/cs490/slides/networks4-ch4-4.pdf.
Aviv Ronai, et al., "Flex Your Backhaul Network with Adaptive Coding & Modulation," White Paper, Ceragon Networks®, © May 2008, 9 pages.
Cisco Systems, Inc., "Multi-Topology Routing," © 2007-2010, 68 pages.
J. Moy, "OSPF Version 2," Network Working Group, RFC 2328, Apr. 1998, 245 pages; http://www.ietf.org/rfc/rfc2328.txt.
Rainer Baumann, et al., "A Survey on Routing Metrics," TIK Report 262, Computer Engineering and Networks Laboratory, Switzerland, Feb. 10, 2007, 53 pages.
Int'l Telecommunication Union (ITU), G.8013/Y.1731, "Series G: Transmission Systems and Media, Digital Systems and Networks," Jul. 2011, 92 pages.
ITU-T Q9-SG 15 (Mar. 2008), "G.8032 Ethernet Ring Protection Overview," Institute of Electronics and Electrical Engineering, Mar. 2008, 23 pages.

\* cited by examiner

SYSTEM AND METHOD FOR LAYER 3 RING PROTECTION WITH ADAPTIVE BANDWIDTH MICROWAVE LINKS IN A NETWORK ENVIRONMENT

RELATED APPLICATION

This application is a divisional (and claims the benefit of priority under 35 U.S.C. §121) of U.S. application Ser. No. 13/847,904, filed Mar. 20, 2013, entitled "SYSTEM AND METHOD FOR LAYER 3 RING PROTECTION WITH ADAPTIVE BANDWIDTH MICROWAVE LINKS IN A NETWORK ENVIRONMENT," Inventors Shwetha Subray Bhandari, et al. The disclosure of the prior application is considered part of (and is incorporated in its entirety by reference in) the disclosure of this application.

TECHNICAL FIELD

This disclosure relates in general to the field of communications and, more particularly, to a system and a method for Layer 3 ring protection with adaptive bandwidth microwave links in a network environment.

BACKGROUND

Networking architectures have grown increasingly complex in communications environments, particularly mobile wireless environments. Wireless communication technologies facilitate many communications devices and systems, including satellite communications systems, portable digital assistants (PDAs), laptop computers, mobile devices (e.g., cellular telephones, user equipment), etc. Wireless communication technologies are handling increasing amounts of data traffic volume, and the types of data being transported through mobile wireless networks have changed dramatically. This is in part because mobile devices are becoming more sophisticated and, further, the mobile devices are able to engage in more data-intensive activities such as displaying movies, playing video games, etc. In many instances, the data sought for delivery is dropped, fragmented, delayed, or simply unavailable to certain end users because of problems in network connectivity. Hence, there is a challenge in providing an appropriate delivery strategy to account for these problematic network scenarios.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes receiving a current bandwidth characteristic for a link, where the current bandwidth characteristic is determined under fading conditions associated with signal propagation on the link. The method can also include calculating a new cost for the link that is different from a nominal cost associated with a nominal bandwidth of the link without the fading conditions. The method could also include routing at least a portion of a plurality of flows that are to traverse the link away from the link based, at least in part, on the new cost. The "bandwidth characteristic" can include any suitable bandwidth information such as, for example, a data rate supported by the link.

In specific embodiments, the link may be a microwave link between a first microwave transceiver and a second microwave transceiver; the first microwave transceiver is connected to a first router over an Ethernet connection, and the second microwave transceiver is connected to a second router over another Ethernet connection. In specific embodiments, the method can be implemented in the first router and the second router. In some embodiments, the current bandwidth under the fading conditions may decrease (e.g., fall) in discrete steps from the nominal bandwidth according to an adaptive coding and modulation scheme. The link may be part of a ring topology in a Layer 3 network environment, and the new cost may be based on the current bandwidth, a number of nodes in the ring, the nominal cost, and the nominal bandwidth. The method can also include maintaining an average bandwidth per flow over the link within a tolerance level under the fading conditions.

In some embodiments, the current bandwidth is received after a hold-off period has transpired since a start of the fading condition, and the new cost is calculated after another hold-off period has transpired since receiving the current bandwidth.

Example Embodiments

Figure 1:
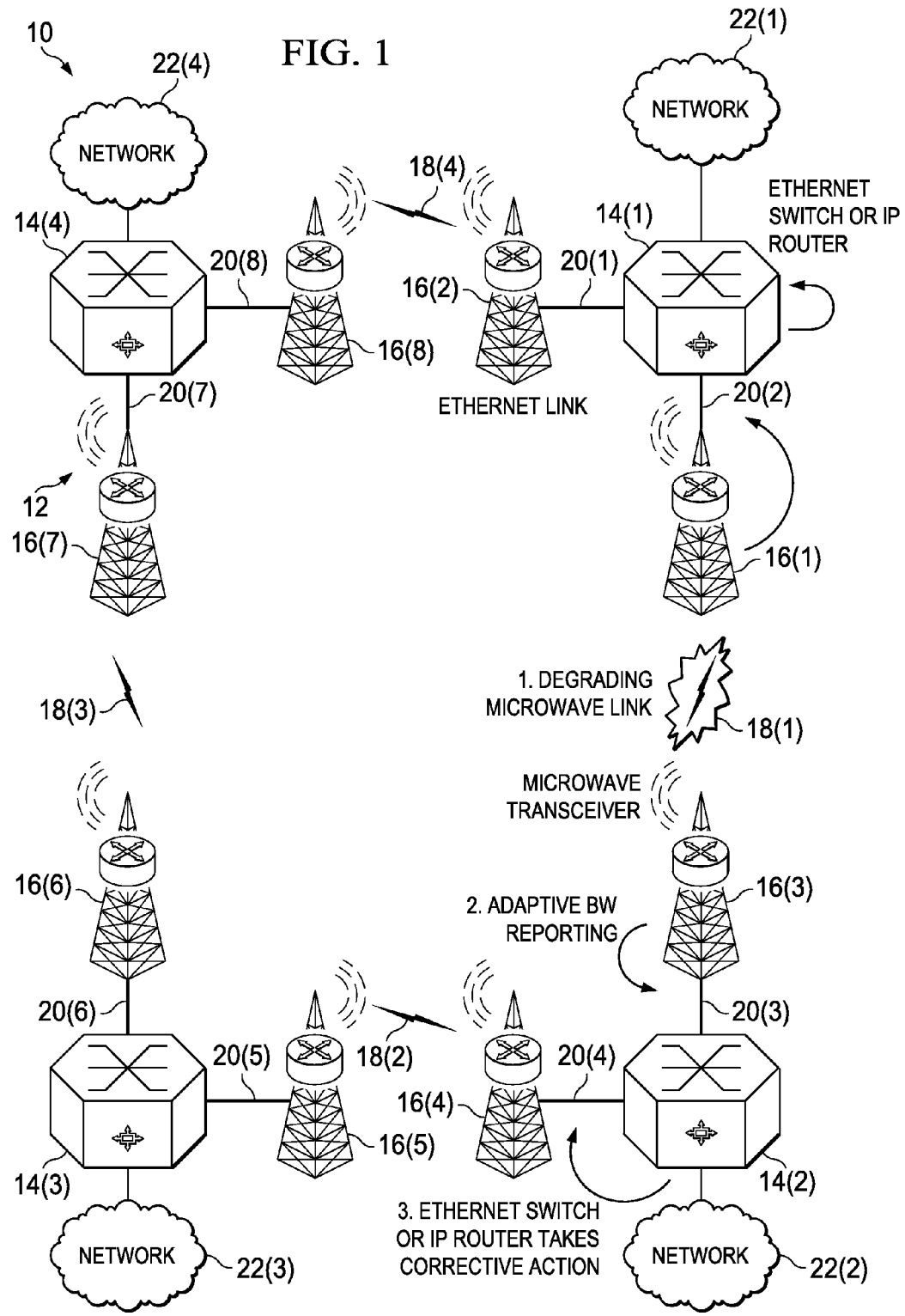
FIG. 1 is a simplified block diagram of a communication system for providing Layer 3 ring protection with adaptive bandwidth microwave links in a network environment in accordance with one embodiment of the present disclosure.

Turning to FIG. 1, FIG. 1 is a simplified block diagram of a communication system 10 for providing Layer 3 ring protection with adaptive bandwidth microwave links in a network environment in accordance with one embodiment.

FIG. 1 may include a plurality of IP routers (or Ethernet switches) 14(1)-14(4), microwave radio transceivers 16(1)-16(8), microwave links 18(1)-18(4), Ethernet links 20(1)-20(8), and networks 22(1)-22(4) in a Layer 3 physical ring topology running an Interior Gateway Protocol (IGP) such as Intermediate System to Intermediate System (IS-IS) or Open Shortest Path First (OSPF) routing protocols. In the ring topology, each node (e.g., router 14(1)-14(4)) connects to exactly two other nodes, forming a single continuous pathway for signals through each node. As used herein, the term "node" refers to any electronic device, client, server, peer, service, application, or other object capable of sending, receiving, or forwarding information over communications channels in a network according to routing (and/or switching) protocols, such as routers 14(1)-14(4). Data (e.g., in the form of a packet) travels from node to node; bandwidth can be shared on all links between the nodes.

The term "switch" and "router" may be interchangeably used in this Specification to refer to any device that can receive, process, and/or forward packets at Layer 3 in a network environment. Switches and routers can serve as intermediate destinations for network traffic, receiving incoming network packets, identifying source and destination network addresses, and forwarding the packets. Routers 14(1)-14(4) may be connected to microwave radio transceivers 16(1)-16(8) using Ethernet links 20(1)-20(8). Microwave radio transceivers 16(1)-16(8) may be connected pairwise over microwave links 18(1)-18(4).

Because the ring topology provides only one optimal pathway between any two nodes, ring networks may be disrupted by the failure or degradation of a single link. Embodiments of communication system 10 are configured to allow the ring to adapt and trigger traffic rerouting, rather than complete loss of connectivity, with bandwidth degradation conditions. Communication system 10 may not require any change to existing protocol messages and, therefore, can be deployed to existing rings by upgrading Ethernet switches (e.g., routers 14(1)-14(4)) connected to microwave transceivers. The mechanism for triggering the Layer 3 ring protection can be based on adaptive bandwidth information from transceivers 16(1)-16(8), as further detailed herein.

For purposes of illustrating certain example techniques of communication system 10, it is important to understand how typical communications may traverse the network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Microwave radios make up a significant part of last-mile backhaul connections. Traditional microwave radios employed fixed modulation schemes, where any degradation in the wave propagation conditions (e.g., due to fog, rain, snow, etc.) led to a complete loss of signal and a disruption of traffic. Thus, the radio link had a binary state of either 'available' (on) or 'not available' (off). Newer microwave radios use an adaptive modulation scheme. When the link degrades due to weather conditions, the radio changes its modulation scheme to a more robust modulation scheme. The radio continues to work, but operates with less capacity. As a result, the radio can be in several capacity or bandwidth states, and not just on or off. Microwave links are often used in Ethernet rings (e.g., ITU-T G.8032 rings) for Radio Access Network (RAN) backhaul. In these ring topologies, capacity degradation can affect one side of the ring, while the other side is still operating at nominal throughput.

Standard ring protection switching or Layer 3 rerouting is triggered by failures when a complete loss of continuity is detected by the ring nodes (e.g., via a loss of connectivity fault management (CFM) Continuity Check messages in the case of an ITU-T G.8032 ring). Therefore, these protocols (as currently defined) are unusable in the case of microwave links with adaptive modulation, where loss in bandwidth generally precedes complete connectivity loss, if at all. For example, if the control protocol used for failure detection is tagged as high priority traffic, the control frames may pass over the degraded (congested) microwave links and no Layer 3 ring protection is triggered. If the control protocol for failure detection is tagged as low priority traffic, then momentary congestion over native Ethernet (i.e., non-microwave) links could lead to loss of continuity and spurious Layer 3 protection. As a result, current Layer 3 ring protection schemes do not fit the needs of deployments with adaptive modulation microwave links.

Certain microwave management techniques focus on the protocol encoding for transferring the bandwidth information from the microwave transceiver to the Ethernet switch. However, such techniques fail to account for this information in the context of Layer 3 ring protection on the switches. For example, ITU-T G.8032 defines Ethernet Ring Automated Protection switching; however, this protocol only defines certain triggers for failover. The triggers can include: 1) a complete loss of continuity over the ring, as detected by the loss of CFM Continuity Check Messages; 2) unidirectional failures over the ring, as detected by the receipt of Remote Defect Indication (RDI) flag in Continuity Check messages; and 3) an administrative configuration (i.e., manual switchover or forced switchover). These strategies fail to define procedures or mechanisms for Layer 3 ring protection based on the available link bandwidth information.

Service providers using microwave radios in their networks seek solutions to embed intelligent protection in the network, allowing the routers in the rings to reroute traffic away from faded microwave links (e.g., microwave links with degraded bandwidth), in order to maintain nominal throughput. Service providers also seek solutions to have the routers act on received microwave bandwidth information and trigger rerouting for selected traffic classes, such that the selected traffic classes are shifted away from the microwave link upon fading events, and restored to the link when the fading subsides. As used herein, the term "class" refers to a classification of network traffic according to various parameters (for example, based on port number or protocol). Examples of different classes include voice, data and video. Each class can be treated differently to differentiate the service implied for the user (data generator/consumer). For example, each traffic class could be subject to a different rate limit, shaped separately and/or prioritized relative to other traffic classes. The differentiation can be used by a service provider to treat different types of traffic differently (for example, prioritize voice over file sharing for the responsiveness perceived by end users), and to offer premium services at a higher price point than basic ones. Packets are typically marked according to their class, as determined by a traffic classifier (e.g., a node in the network that assesses which class a particular packet should belong to, and marks it with a Differentiated Services Code Point (or DSCP) accordingly). Upon classifying a traffic using a particular protocol, a predetermined policy can be applied to it and other flows to either guarantee a certain quality (as with VoIP or media streaming service) or to provide best-effort delivery. For example, the service provider may want to configure a policy for the best-effort delivery of data traffic, which can comprise the bulk of its traffic and can be less delay sensitive, to be re-routed away from a faded link while allowing the priority voice traffic to continue traversing the faded link (as the voice traffic may be less bandwidth intensive and more delay sensitive, and the faded link bandwidth could be satisfactory in many cases).

In many deployments, these rings are based on Internet Protocol (IP) and run a Layer 3 (IGP) routing protocols such as Open Shortest Path First (OSFP) or Intermediate System to Intermediate System (IS-IS). IGP assigns a cost to every link, based on a predefined formula, such as $10^8$/BW of the link (where BW refers to the bandwidth), and computes the shortest path from every router to every other router (e.g., shortest path first algorithm) that has the lowest cost. If the bandwidth increases, the cost decreases, and vice versa. In other words, the faster the link, the lower the cost.

For example, OSPF is an IGP that routes IP packets solely within a single routing domain called an autonomous system. Link state information from available routers may be gathered to construct a topology map of the network. The topology can determine a routing table used to make routing decisions based on the destination IP address found in IP packets. A specific router generates its routing table by calculating a tree of shortest paths with the router itself as root. The tree gives the entire path to any destination network or host. OSPF can detect changes (e.g., link failures) in the network topology quickly and converge on a new loop-free routing structure.

OSPF computes the shortest path tree for each route using a method based on Dijkstra's algorithm, a shortest path first algorithm. If multiple equal-cost routes to a destination exist, they are all discovered and used. The link-state information is maintained on each router as a link-state database (LSDB) which is a tree-image of the entire network topology. Identical copies of the LSDB are periodically updated through flooding on all OSPF routers. The OSPF routing policies (to construct a route table) are governed by link cost factors (e.g., distance of a router (round-trip time), network throughput of a link, or link availability and reliability) associated with each routing interface. The cost, which is configurable by the system administrator, is typically associated with the output side of each router interface. The lower the cost, the more likely the interface is to be used to forward data traffic. Costs can also be associated with externally derived routing data (e.g., border gateway protocol (BGP)-learned routes).

Unlike a wired link, whose bandwidth may remain constant, the bandwidth of microwave links can change depending on various external factors (such as weather). Microwave links can require line-of-sight between the receiver and transmitter and therefore, can be susceptible to weather conditions, such as rain and fog, and other obstructive phenomena. Microwave transceivers react to these fading conditions by changing the modulation scheme of the signals, thereby changing the bandwidth of the microwave link. As used herein, the term "fading condition" includes any state that disrupts (e.g., disturbs, degrades, fades, reduces, breaks down) signal propagation on the link. Commonly, fading conditions can manifest due to changing refractivity of the medium through which the radio waves propagate, typically caused by fog, rain, dust, snow, and other atmospheric conditions. For example, seasonal or diurnal variations in the average refractivity gradients affect signal propagation and can contribute to fading conditions. Another example of a fading condition is rain. If the signal propagation is disrupted, the bandwidth degrades, and traffic flows over the link may be affected (e.g., because of congestion and consequent loss of packets).

The nature of operation of microwave Adaptive Coding and Modulation (ACM) scheme (which refers to the automatic adjustment made by the microwave transceivers to optimize over-the-air transmission and prevent weather-related fading from causing disruption of communication on the link) causes the bandwidth to drop in discrete steps, depending on the level of fading on the link and the associated modulation type used. For example, a 171 Mbps link drops in the following discrete steps: 145 (128 QAM), 125 (64 QAM), 104 (32 QAM), 83 (16 QAM), 63 (8 PSK), 42 (4QAM), 36 Mbps (4QAMs). When weather conditions, such as a storm, affect the transmission and receipt of data and voice over the microwave link, an ACM-enabled microwave transceiver may change modulation and/or coding allowing real-time applications to continue to run uninterrupted. Varying the modulation and/or coding can also vary the amount of bits transferred per signal, thereby enabling varying throughputs.

Assume a microwave transceiver configured for 256 QAM with 500 Mbps capacity. When the receive signal Bit Error Ratio (BER) level reaches a predetermined threshold, the microwave transceiver may preemptively switch to 128 QAM and the throughput may be stepped down to 400 Mbps. The microwave transceiver may run at 128 QAM until the fading condition either intensifies, or disappears. If the fading condition intensifies, another step down to 64 QAM may be implemented. On the other hand, if the weather condition improves, the modulation may be switched back to the next higher step (e.g. 128QAM) and so on, step by step.

Some microwave radio transceivers can communicate the available bandwidth over the respective microwave links to directly attached routers using communication mechanisms based on extensions of the ITU-T Y.1731 protocol. For ring topologies, link cost calculation algorithms, in which the link cost is inversely proportional to the bandwidth, do not perform balanced rerouting around the faded link, as the ACM bandwidth degradation steps kick in. In other words, if new costs were calculated using these algorithms (and shortest path routes recalculated) at each step drop in bandwidth, such recalculation would lead to unbalanced rerouting.

Some OSPF cost-fallback for bundled interfaces can allow the system administrator to statically specify a new (e.g., higher) cost for a bundle interface when member links go down. However, such a solution can have the following issues: (i) the system administrator statically configures the new cost to be used upon member link failure; topology changes would demand configuration update on a node by node basis; (ii) there is no guidance on the algorithm or approach for determining the new link cost for various bandwidth thresholds—the solution only allows two costs, namely a nominal cost, and a degraded (fallback) cost, that can be associated with the interface, but does not specify how those costs are to be calculated or derived; (iii) current implementation only allows a single bandwidth threshold to trigger the cost change; microwave links with ACM degrade in a multi-level ladder manner, and, as such, multiple thresholds would be typically appropriate.

Some Enhanced Interior Gateway Routing Protocol (EIGRP) algorithms used to route packets in a Layer 3 network may not take into account the size of the ring in calculating the routes, and as such does not produce desired failover characteristics for ACM capable links. The behavior of EIGRP is similar to OSPF and does not produce gradual failover characteristics with degrading bandwidth. Moreover, IP RAN networks where ACM links are typically deployed do not currently implement EIGRP.

Turning to class-specific routing policies in the microwave ring network context, Multi-Topology Routing (MTR) implementations for IGPs (OSPF/ISIS) already exist and are mainly used to provide service differentiation on a permanent basis in the network. A typical example of MTR includes voice, video and data services using different logical MTR topologies overlayed on top of the same physical topology in order to minimize delay or jitter and to maximize bandwidth utilization. As used herein, "MTR topology" includes a subset of routers and links in a network for which a separate set of routes is calculated. The MTR topology can overlap with another or share any subset of the underlying network (also called base MTR topology). The base MTR topology may be characterized by Network Layer Reachability Information (NLRI) that a router uses to calculate its global routing table to make routing and forwarding decisions. In other words, the base MTR topology is the default routing environment that exists prior to enabling MTR. Any additional MTR topologies are referred to as class-specific MTR topologies and are a subset of the base MTR topology.

Each class-specific MTR topology carries a class of traffic and is characterized by an independent set of NLRI that is used to maintain a separate Routing Information Base (RIB) and Forwarding Information Base (FIB). Such configuration allows the router to perform independent route calculation and forwarding for each MTR topology. Within a given router, MTR creates a selection of routes upon which to forward to a given destination. The specific choice of route is based on the class of the packet being forwarded, a class that can be an attribute of the packet itself. The configuration allows packets of different classes to be routed independently from one another. The path that the packet follows is determined by classifiers configured on the routers and interfaces in the network.

MTR can be configured to handle complete failure of any specific link in a MTR topology. For example, MTR can be configured to choose a backup path (e.g., base topology, or any other topology) when a link in a specific path fails. However, MTR in its current form neither recognizes nor acts (e.g., change links of a topology) based on dynamic link fading events. Furthermore, a given link's membership in a specific MTR topology is determined through static administrative policy (e.g., configuration) and is not generally changed after initial configuration.

In accordance with one example implementation, communication system 10 can resolve the aforementioned issues (and potentially others) associated with Layer 3 ring traffic protection. In various embodiments, microwave links 18(1)-18(4) may include ACM capabilities, wherein fading conditions may cause bandwidth over microwave links 18(1)-18(4) to decrease in discrete steps according to the ACM scheme. For example, bandwidth may fall under fading conditions according to switching from 256 QAM to 128 QAM, to 64 QAM, to 32 QAM, to 16 QAM, to 8 QAM, and to 4 QAM in discrete steps. Microwave transceivers 16(1)-16(8) may be configured to determine the current bandwidth (CB) over associated microwave links 18(1)-18(4). In some embodiments, microwave transceivers 16(1)-16(8) may communicate the current bandwidth under the fading condition to respectively connected routers 14(1)-14(4) through a mechanism based on extensions of ITU-T Y.1731 protocol.

According to various embodiments, routers 14(1)-14(4) can act on the received microwave bandwidth information from microwave transceivers 16(1)-16(8), compute a new cost associated with the degraded microwave link, and trigger IGP path re-computation, such that traffic is shifted away gradually from the degraded microwave link upon occurrence of fading conditions, and be gradually restored to the link when the fading conditions subside. As the bandwidth over the link degrades, embodiments of communication system 10 can maintain the bandwidth per flow for each flow passing through the faded microwave link at a substantially constant value, within a tolerance level of the original bandwidth that was given to the flow before the fading condition occurred. As used herein, the term "flow" includes a sequence of packets from a specific source to a specific destination (which may include unicast, multicast, and broadcast packets). A specific flow may be identified by the source and destination information (e.g., Internet Protocol (IP) addresses) provided in the packet headers of the packets comprising the flow.

Merely for the same of illustration, and not as a limitation, assume that 10 flows traverse microwave link 18(1), which has a bandwidth of 10 Mbps (i.e., 1 Mbps/flow) in the absence of fading. Assume that link bandwidth degrades to 5 Mbps due to foggy conditions. Embodiments of communication system 10 can change the cost of microwave link 18(1) such that the number of flows through microwave link 18(1) drops down to maintain the bandwidth per flow. For example, five out of the 10 flows may be re-routed via a slightly longer path, and the other five may continue to pass through microwave link 18(1), with a bandwidth of 1 Mbps/flow as before the fading condition. The flows that are re-routed away from the faded link may take a slightly longer path than originally, but may not face as much congestion as they would have faced had they remained on faded microwave link 18(1).

Microwave radio transceivers 16(1)-16(8) may inform routers 14(1)-14(4) of the nominal microwave link bandwidth, as well as the degraded bandwidth upon a fading condition using any suitable mechanism, such as Y.1731 extensions. For example, microwave radio transceivers 16(1)-16(8) may actively monitor the bandwidth over respective microwave links 18(1)-18(4) and report the statistical average of the sampled values over a monitoring interval to corresponding routers 14(1)-14(4). In some embodiments, the average bandwidth value rather than the minimum value may communicated to routers 14(1)-14(4), for example, to avoid triggering protection mechanism as a result of a short-lived fading condition (e.g. due to an object passing through the line of sight). In other embodiments, the minimum value may be communicated to routers 14(1)-14 (4). The sampling rate for the bandwidth may vary based on particular needs. In some embodiments, a minimum rate of 4 samples per interval for the shortest monitoring interval (e.g., 1 second) may be maintained, and the sampling rate may be increased as the monitoring interval increases.

In some embodiments, if a degradation is sensed, microwave transceivers 16(1)-16(8) may wait for a hold-off period (e.g., hysteresis to prevent oscillations) before sending the degraded bandwidth information to respective routers 14(1)-14(4). Routers 14(1)-14(4) may be configured to act on the information substantially immediately in some embodiments. In other embodiments, routers 14(1)-14(4) may wait for another hold-off period (e.g., to introduce dampening), for example, with a timer. After the timer expires, the router may calculate the new cost, triggering a recalculation of the shortest path forwarding topology. During operation, the bandwidth of the degraded link(s) could further decrease or return to nominal in real time; the corresponding bandwidth information may be relayed to respective routers 14(1)-14(4) in real time in some embodiments. In such cases, the hold-off period at routers 14(1)-14(4) can prevent excessive recalculations due to frequent changes in weather conditions or other fading conditions. The hold off periods (at routers 14(1)-14(4) and microwave transceivers 16(1)-16(8)) can be configured by the system/network administrator suitably based on particular needs.

For purposes of illustration, and not as a limitation, assume that an embodiment of communication system 10 uses OSPF as the routing protocol. Assume also that microwave link 18(1) has a nominal bandwidth of NB without fading conditions. Routers 14(1) and 14(2) may set an initial link cost (called Nominal Cost (NC)) to a default value of $10^8$/NB. Assume that microwave link 18(1) degrades due to a fading condition (e.g., fog, rain, etc.). Microwave transceivers 16(1) and 16(3) may detect the change in bandwidth and report the changed bandwidth information to respective routers 14(1) and 14(2). Routers 14(1) and 14(2) may calculate a new cost (C) for microwave link 18(1) so that the new cost is higher than the nominal cost to force flows to be rerouted away from faded microwave link 18(1).

The new cost value may be chosen so that the average bandwidth per flow, for flows that continue to traverse the faded link, is equal to the average bandwidth per flow in the absence of fading plus or minus a tolerance level (T). In other words, assuming F flows traverse link 18(1) with a link bandwidth of NB when there is no fading, the new cost may ensure that the new number of flows (F') traversing the degraded link with current bandwidth (CB) under fading conditions is according to the following equation:

$$\frac{NB}{F} = \frac{CB}{F'} \pm T$$

The tolerance level T can be defined by a network operator, and may be equal to zero, or any other desired value.

If the ring network had no failures, there would be two paths between any pair of source and destination nodes. When equal cost paths exist between a source and destination, traffic may be load-balanced between the paths. If a link in the ring is part of a unique shortest path between a given [source, destination] tuple, substantially all the data from the source may traverse through the link. If the link is part of equal cost shortest path between a given [source, destination] tuple, the data from the source may be load-balanced between equal cost paths and part of the data may traverse the link. By assuming equal load distribution between equal cost paths, in a ring with 'n' nodes, any given link may be part of FLOOR($n^2$/4) flows between any source and any destination nodes.

If the cost of a link in the ring is C, then by increasing the cost of the link to γ×C, where γ is a positive integer, the number of flows traversing the link reduces to FLOOR((n−γ+1)$^2$/4). The number of flows through the link reduces with the change in cost because of various factors, including: (i) existing equal cost paths traversing the link may no longer be equal cost paths with the new cost; or (ii) some of the unique shortest paths traversing the link may become equal cost to an alternate path that bypasses the link.

Assume, merely for the sake of illustration, and not as a limitation, that the network traffic is equally distributed between all [source, destination] tuples on the ring. Further, assume that each flow consumes 'k' bps between any source and any destination node in the ring. For a given [source, destination] tuple, a specific link may be used for all flows from the source to the destination if it is part of the shortest path first (SPF) between the [source, destination] tuple and there is no alternate equal cost path. Hence the specific link may see all the k bps between [source, destination] tuple. The specific link may be used for 50% of the flows between a [source, destination] tuple if there exists an alternate equal cost path. Hence the specific link may see only 0.5 k bps flowing between the [source, destination] tuple.

In a ring with 'n' nodes with all links of equal cost, a specific link with nominal bandwidth NB, nominal cost NC may see k×FLOOR($n^2$/4) bits flowing in the network between any source and any destination. By increasing the cost in integer multiples, equal cost paths using the link may be failed over or alternate paths that do not use the link may be made an equal cost path to reduce the traffic flowing through the link. If the nominal cost of the link in the ring is NC, then by increasing the cost of that link to γ×NC, the number of flows traversing the link reduces to FLOOR((n−γ+1)$^2$/4). Cost changes may be most effective in such scenarios when implemented in steps of NC.

In the ring with n nodes, when the cost of a specific link changes from C to 2 C, the number of flows through the specific link drops to FLOOR((n−1)$^2$/4). When the cost of the link changes from C to 3 C, the number of flows reduces to FLOOR((n−2)$^2$/4). When the cost of the link changes from C to 4 C, the number of flows traversing the specific link reduces to FLOOR((n−3)$^2$/4), and so on. To calculate the cost of a specific link in the ring with n nodes, where the nominal bandwidth of the link is NB, the nominal cost is NC, the current bandwidth of the link is CB, the current cost of the link is C, and F flows use the link when its bandwidth is NB, bandwidth NB may be equally divided across F flows, so that each flow has bandwidth K.

$$F = \text{FLOOR}\left(\frac{n^2}{4}\right)$$

$$K = \frac{NB}{F} = \frac{NB}{\text{FLOOR}\left(\frac{n^2}{4}\right)}$$

If cost changes to twice the nominal cost, the number of flows retaining bandwidth K per flow changes to:

$$F' = \text{FLOOR}\left(\frac{(n-1)^2}{4}\right)$$

If the cost changes to 3×NC, the number of flows retaining bandwidth K per flow changes to:

$$F'' = \text{FLOOR}\left(\frac{(n-2)^2}{4}\right)$$

and so on. If the cost changes to γ×NC, the number of flows retaining bandwidth K per flow changes to:

$$F_y = \text{FLOOR}\left(\frac{(n-y+1)^2}{4}\right)$$

Thus, to maintain K constant, for flows traversing the faded link with changes in bandwidth, the number of flows may be reduced in proportion.

A multitude of cost calculation functions can yield a new cost that reroutes flows such that the average bandwidth per flow over the faded link is substantially maintained within a tolerance level T. For example, the new cost C under fading conditions can be calculated according to the following equation:

$$C = NC \times \left(1 + n \times \left(1 - \frac{CB}{NB}\right)\right)$$

where n is the number of nodes in the ring. In another example, where the tolerance T is zero, the new cost C can be calculated according to the following equation:

$$C = NC \times \left(1 + \text{CEIL}\left(n \times L \times \left(1 - \sqrt{\frac{CB}{NB}}\right)\right)\right)$$

where L is a user configurable multiplier having any value between 0 and 1. Routers 14(1) and 14(2) may use the new cost to trigger IGP route recalculation, which can cause traffic to be rerouted away from faded microwave link 18(1). It may be noted that the equation stated herein is merely one example cost calculation scheme. Embodiments of communication system 10 can use any suitable algorithm, formula, or equation that dynamically adjusts the link cost such that the average bandwidth per flow for flows traversing the degraded link remains constant within the user-defined tolerance level T.

Networks 22(1)-22(4) represent a series of points or nodes of interconnected communication paths for receiving and transmitting packets of information that are delivered to communication system 10. Networks 22(1)-22(4) offer a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. Networks 22(1)-22(4) may implement a UDP/IP connection and use a TCP/IP communication language protocol in particular embodiments of the present disclosure. Further, networks 22(1)-22(4) may implement any other suitable communication protocol for transmitting and receiving data packets to communication system 10.

The architecture of the present disclosure can be associated with a service provider Radio Access Network (RAN) backhaul deployment. In other examples, the architecture of the present disclosure would be equally applicable to other communication environments, cable scenarios, microwave systems generally, broadband generally, fixed wireless instances, fiber to the x (FTTx), which is a generic term for any broadband network architecture that uses optical fiber in last-mile architectures, and any other suitable networking architectures. The architecture of the present disclosure may include a configuration capable of transmission control protocol/internet protocol (TCP/IP) communications for the transmission and/or reception of packets in a network. The architecture of the present disclosure may also operate in conjunction with a user datagram protocol/IP (UDP/IP) or any other suitable protocol, where appropriate and based on particular needs. Moreover, although the embodiment of communication system described with respect to FIG. 1 relates to microwave links, the operations described herein can be implemented on any switch/router directly connected to a Layer 3 link (not necessarily microwave links) capable of adaptive bandwidth modulation.

Routers 14(1)-14(4) and microwave transceivers 16(1)-16(8) are network elements that can facilitate the Layer 3 ring protection activities discussed herein. In some embodiments, routers 14(1)-14(4) may forward packets according to certain specific protocols (e.g., TCP/IP, UDP, etc.). As used herein in this Specification, the term "network element" is meant to encompass routers, transceivers, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, routers 14(1)-14(4) and microwave transceivers 16(1)-16(8) include software to achieve (or to foster) the Layer 3 ring protection activities discussed herein. In other embodiments, these Layer 3 ring protection activities may be executed externally to these elements, or included in some other network element to achieve the intended functionality. Alternatively, routers 14(1)-14(4) and microwave transceivers 16(1)-16(8) may include software (or reciprocating software) that can coordinate with other network elements in order to achieve the Layer 3 ring protection activities described herein. In still other embodiments, one or several devices may include any suitable algorithms, hardware, software, components, modules, interfaces, or objects that facilitate the operations thereof.

Embodiments of communication system 10 may implement an algorithm for IGP link cost calculation to maximize bandwidth utilization in ring networks with microwave links having ACM capabilities. The algorithm may guarantee that the average bandwidth per flow, for flows traversing the faded link, is maintained (within tolerance T) upon fading conditions. The algorithm may cover a family of cost calculation formulae that derive the link cost based on: the nominal link cost (without fading), the nominal link bandwidth (without fading), the current (degraded) bandwidth and the total number of nodes in the ring. The algorithm may provide optimal rerouting of traffic around the faded link based on the level of fading.

Figure 2:
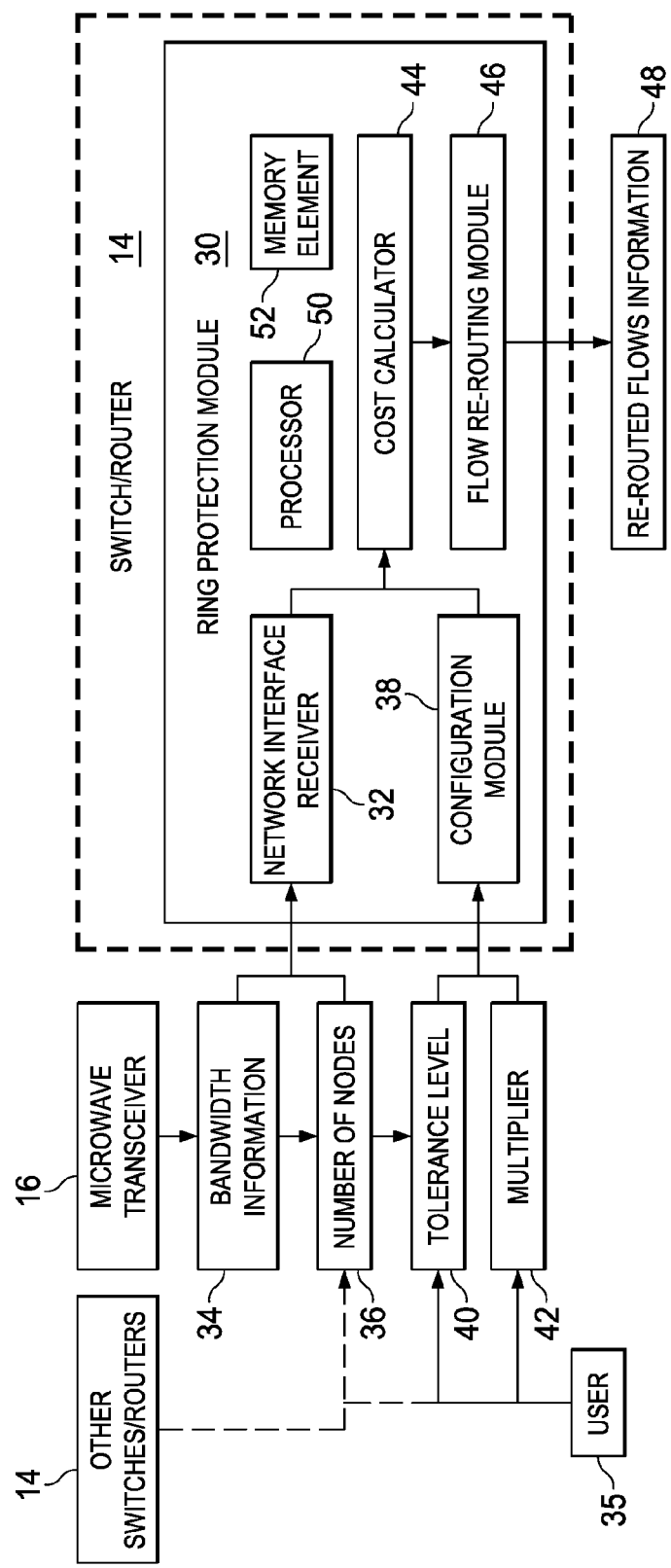
FIG. 2 is a simplified block diagram illustrating possible example details associated with the communication system in accordance with one embodiment.

Turning to FIG. 2, FIG. 2 is a simplified block diagram illustrating one possible set of details associated with communication system 10. Example router 14 in an Ethernet ring topology may include a ring protection module 30. A network information receiver 32 in ring protection module 30 may receive bandwidth information 34 from an example microwave transceiver 16. Bandwidth information 34 can include bandwidth value, for example, in Mbps. Network information receiver 32 may also receive information regarding number of nodes 36 from other routers 14 in the ring. Alternately, the number of nodes 36 may be obtained from a user 35. User 35 may include a system administrator, network administrator or other entity that can configure router 14 as desired. A configuration module 38 in ring protection module 30 may receive a tolerance level (T) 40 and a multiplier (L) 42 from user 35. A cost calculator 44 may calculate a cost of a particular link based on bandwidth information 34 of the particular link, taking into account number of nodes 36, tolerance level 40 and multiplier 42. A flow re-routing module 46 in ring protection module 30 may recalculate a shortest path based on the newly calculated cost. Re-routed flows information 48 may be advertised within the ring, or stored appropriately in a routing table based on particular needs. A processor 50 and a memory element 52 may facilitate the operations of ring protection module 30.

Figure 3:
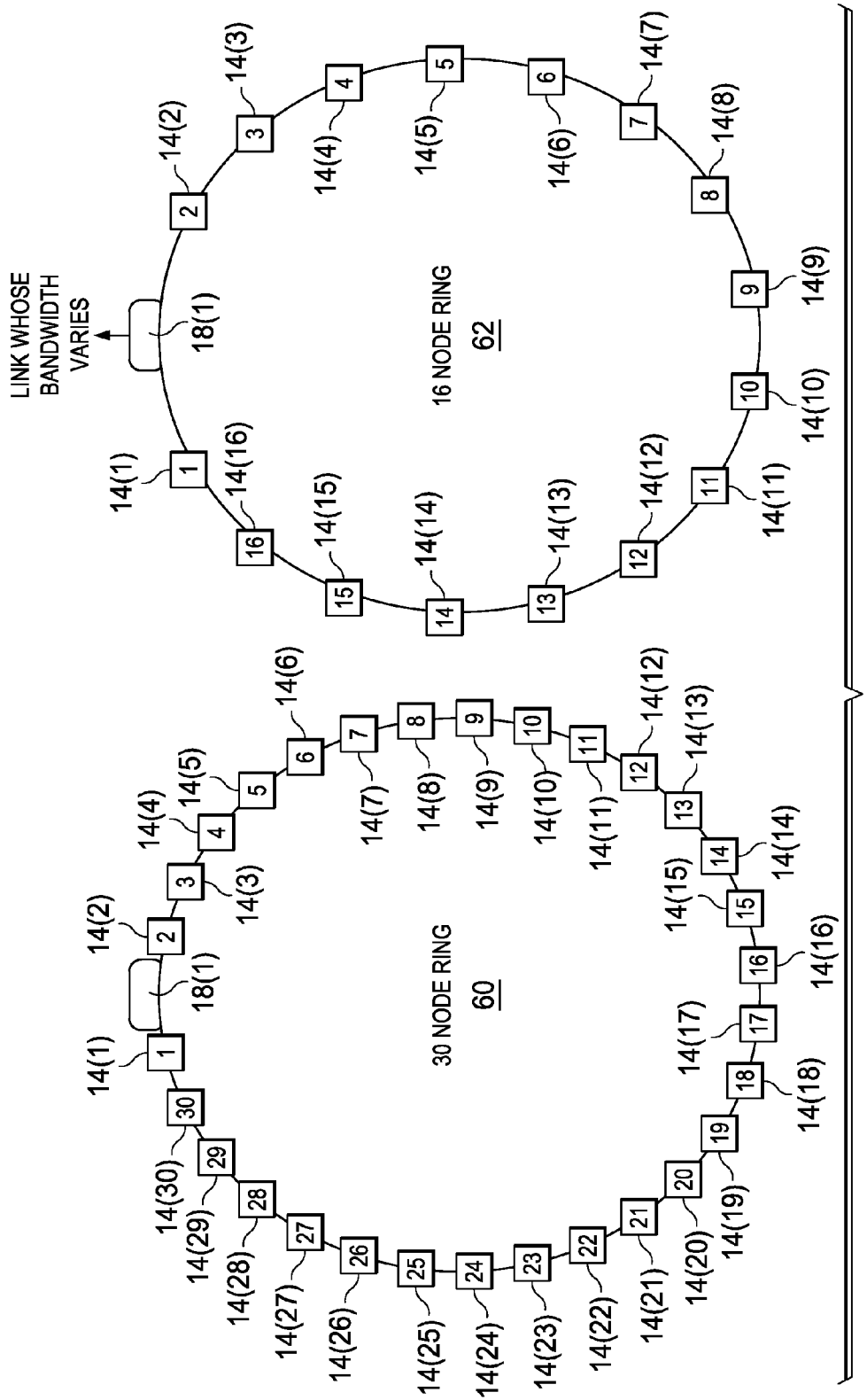
FIG. 3 is a simplified block diagram illustrating possible example details associated with the communication system in accordance with one embodiment.

Turning to FIG. 3, FIG. 3 is a simplified block diagram illustrating two example ring topologies according to an embodiment of communication system 10. Example ring topology 60 includes 30 nodes (e.g., routers 14(1)-14(30)) and example ring topology 62 includes 16 nodes (e.g., routers 14(1)-14(16)). In both ring topologies, assume (merely as an example, and not as a limitation) that link 18(1) between router 14(1) and router 14(2) degrades due to fading conditions. The example features described in connection with FIG. 3 can be used to describe network behavior of rings 60 and 62 as explained further in FIGS. 4A and 4B.

Figure 4A:
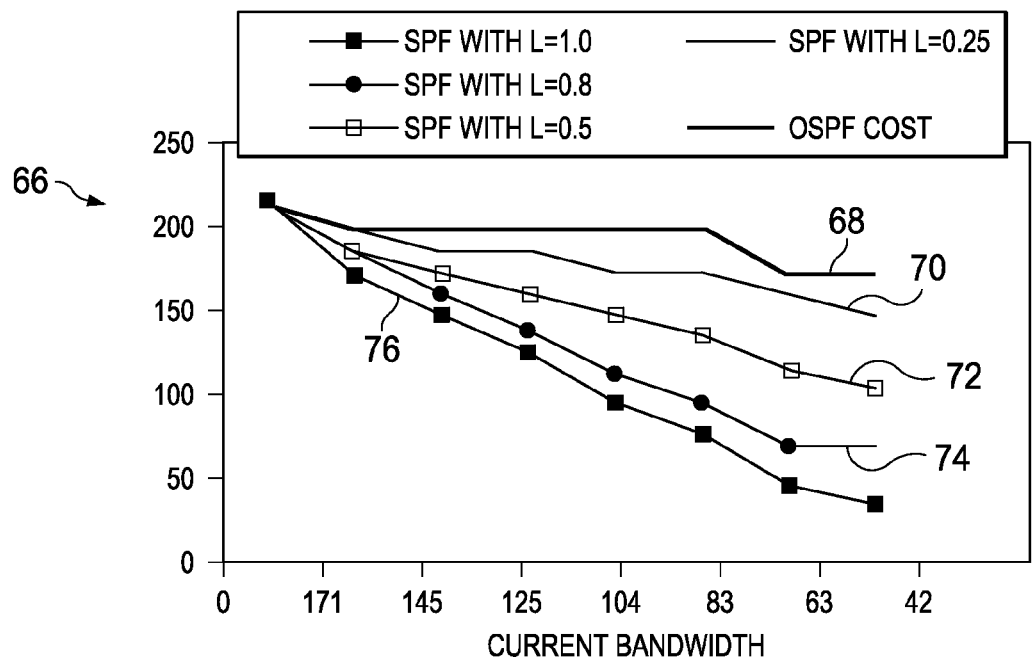
FIG. 4A is a simplified graph illustrating possible example details associated with the communication system in accordance with one embodiment.
Figure 4B:
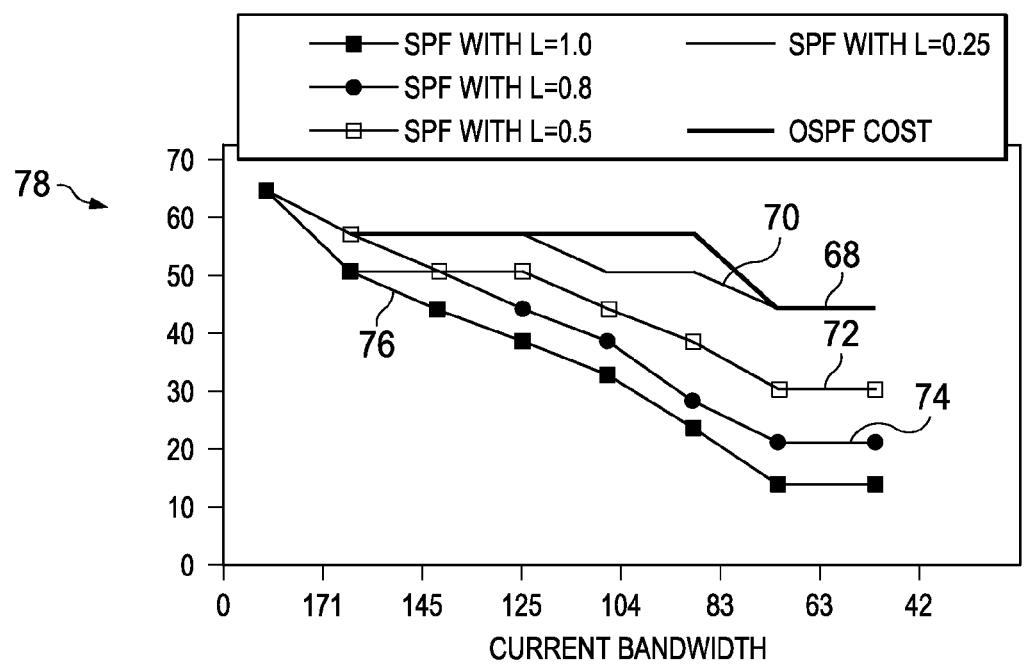
FIG. 4B is another simplified graph illustrating possible example details associated with the communication system in accordance with one embodiment.

Turning to FIGS. 4A and 4B, FIGS. 4A and 4B are simplified graphs of flows plotted against bandwidth for various cost calculations according to embodiments of communication system 10. Graph 66 includes plots of flows traversing link 18(1) versus bandwidth on link 18(1) in ring topology 60 having 30 nodes. The bandwidth drops according to ACM in steps comprising {171, 145, 125, 104, 83, 63, 42} where bandwidth values are in Mbps. Line 68 indicates flows vs. bandwidth for a traditional (typical) OSPF cost calculation of $10^8/CB$, where CB is the current bandwidth under fading conditions. As the bandwidth reduces in steps, the cost likewise reduces in steps, and is reflected in the flows that also reduce in steps. Lines 70-76 represent cost calculations according to embodiments of communication system, with each line representing a different multiplier L in the cost equation:

$$C = NC \times \left(1 + \text{CEIL}\left(n \times L \times \left(1 - \sqrt{\frac{CB}{NB}}\right)\right)\right)$$

Line 70 represents L=0.25; line 72 represents L=0.5; line 74 represents L=0.8; and line 76 represents L=1.

If link 18(1) is part of a unique Shortest Path (SP) between any source and destination pair, the SP is weighed as 1. If link 18(1) is part of an equal cost SP, the SP is weighed as 0.5. The lines are obtained by summing up all the SPs that use link 18(1) based on the new cost C. Graph 66 indicates that the cost algorithm according to embodiments of communication system 10 can out-perform traditional OSPF cost based routing in terms of providing better failover characteristics and smoother transitions with fading conditions.

As the value of L progresses from 0.25 to 1, the respective lines 72-76 smooth out, with fewer number of steps, and substantially maintaining the bandwidth per flow. For example, in line 76, the bandwidth is 171 Mbps, with number of flows being 225, giving a bandwidth per flow of approximately 0.76 Mbps/flow. As bandwidth reduces to 145, the number of flows reduces to 182, with a bandwidth per flow of approximately 0.79 Mbps/flow. As bandwidth reduces further to 125, the number of flows reduces to 156, with a bandwidth per flow of approximately 0.8 Mbps/flow. As bandwidth reduces still further to 63 Mbps, the number of flows reduces to 81, with a bandwidth per flow of approximately 0.78 Mbps/flow. In contrast, with traditional OSPF cost accounting, the bandwidth per flow reduces from 0.76 Mbps/flow at 171 Mbps for 225 flows down to 0.3 Mbps/flow at 63 Mbps with 210 flows.

Turning to FIG. 4B, graph 78 includes plots of flows traversing link 18(1) versus bandwidth on link 18(1) in ring topology 62 having 16 nodes. As before with respect to FIG. 4A, line 70 represents L=0.25; line 72 represents L=0.5; line 74 represents L=0.8; and line 76 represents L=1. For example, in line 76, the bandwidth is 171 Mbps, with number of flows being 64, giving a bandwidth per flow of approximately 2.7 Mbps/flow. As bandwidth reduces to 145, the number of flows reduces to 49, with a bandwidth per flow of approximately 2.9 Mbps/flow. As bandwidth reduces further to 125, the number of flows reduces to 42, with a bandwidth per flow of approximately 2.9 Mbps/flow. As bandwidth reduces still further to 63 Mbps, the number of flows reduces to 20, with a bandwidth per flow of approximately 3.1 Mbps/flow. In contrast, with traditional OSPF cost accounting, the bandwidth per flow reduces from 2.7 Mbps/flow at 171 Mbps for 64 flows down to 1.1 Mbps/flow at 63 Mbps with 56 flows.

Figure 5:
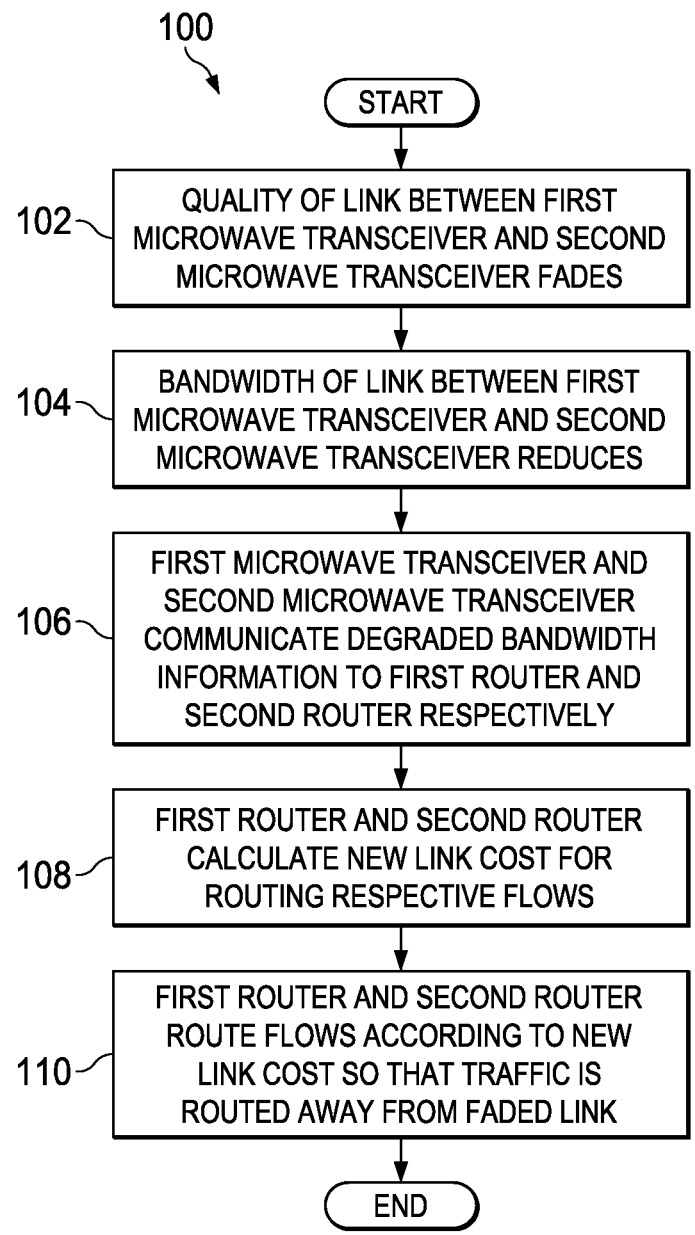
FIG. 5 is a simplified flowchart illustrating potential example operations that may be associated with embodiments of the communication system.

Turning to FIG. 5, FIG. 5 is a simplified flow diagram illustrating example operations 100 that may be associated with embodiments of communication system 10. Operations 100 can include 102, at which a quality of the link (e.g., 18(1) of FIG. 1) between a first microwave transceiver (e.g., 16(1)) and a second microwave transceiver (e.g., 16(3)) fades (e.g., degrades, decays, breaks down, reduces, fails, weaken). At 104, bandwidth of link 18(1) between first microwave transceiver 16(1) and a second microwave transceiver 16(3) reduces. At 106, first microwave transceiver 16(1) and second microwave transceiver 16(3) may communicate the degraded bandwidth information (e.g., bandwidth value in Mbps approximately at time of communication) to a first router (e.g., router 14(1)) and a second router (e.g., router 14(2)), respectively. At 108, first router 14(1) and second router 14(2) may calculate a new link cost for routing flows over degraded link 18(1). At 110, first router 14(1) and second router 14(2) may route flows according to the newly calculated link cost so that traffic is diverted away from the faded link 18(1).

Figure 6:
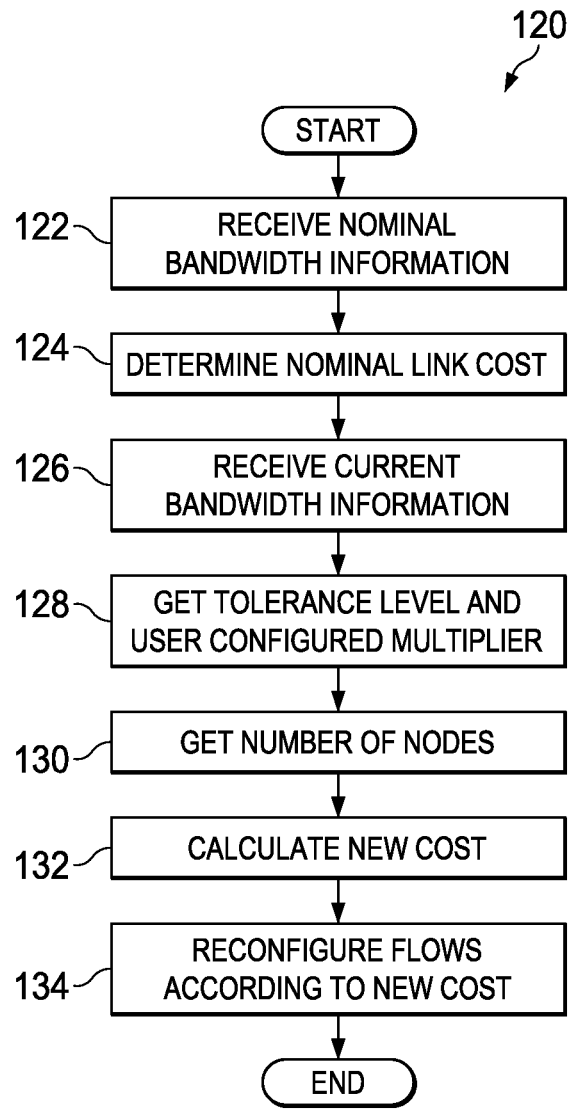
FIG. 6 is a simplified flowchart illustrating other potential example operations that may be associated with embodiments of the communication system.

Turning to FIG. 6, FIG. 6 is a simplified flow diagram illustrating example operations 120 that may be associated with embodiments of communication system 10. Operations 120 may include 122, at which a nominal bandwidth information (e.g., bandwidth of link without fading conditions) of a link (e.g., 18(1)) may be received at a router (e.g., router 14(1)). The nominal bandwidth may be NB. At 124, an initial link cost (e.g., nominal cost NC=$10^8$/NB) may be set. At 126, degraded bandwidth information may be received at router 14(1). At 128, a tolerance level (T) and a user configured multiplier (L) may be obtained (e.g., through user configuration settings). At 130, number of nodes (n) in the ring may be obtained (e.g., from other routers, or user configurations). At 132, a new cost (C) may be calculated as a function of initial cost (e.g., nominal cost NC), degraded bandwidth (CB), nominal bandwidth (NB), number of nodes (n), and user configured multiplier (L).

$$C = f(NC, CB, NB, n, L)$$

At 134, flows over degraded link 18(1) may be reconfigured according to the new cost C.

Figure 7:
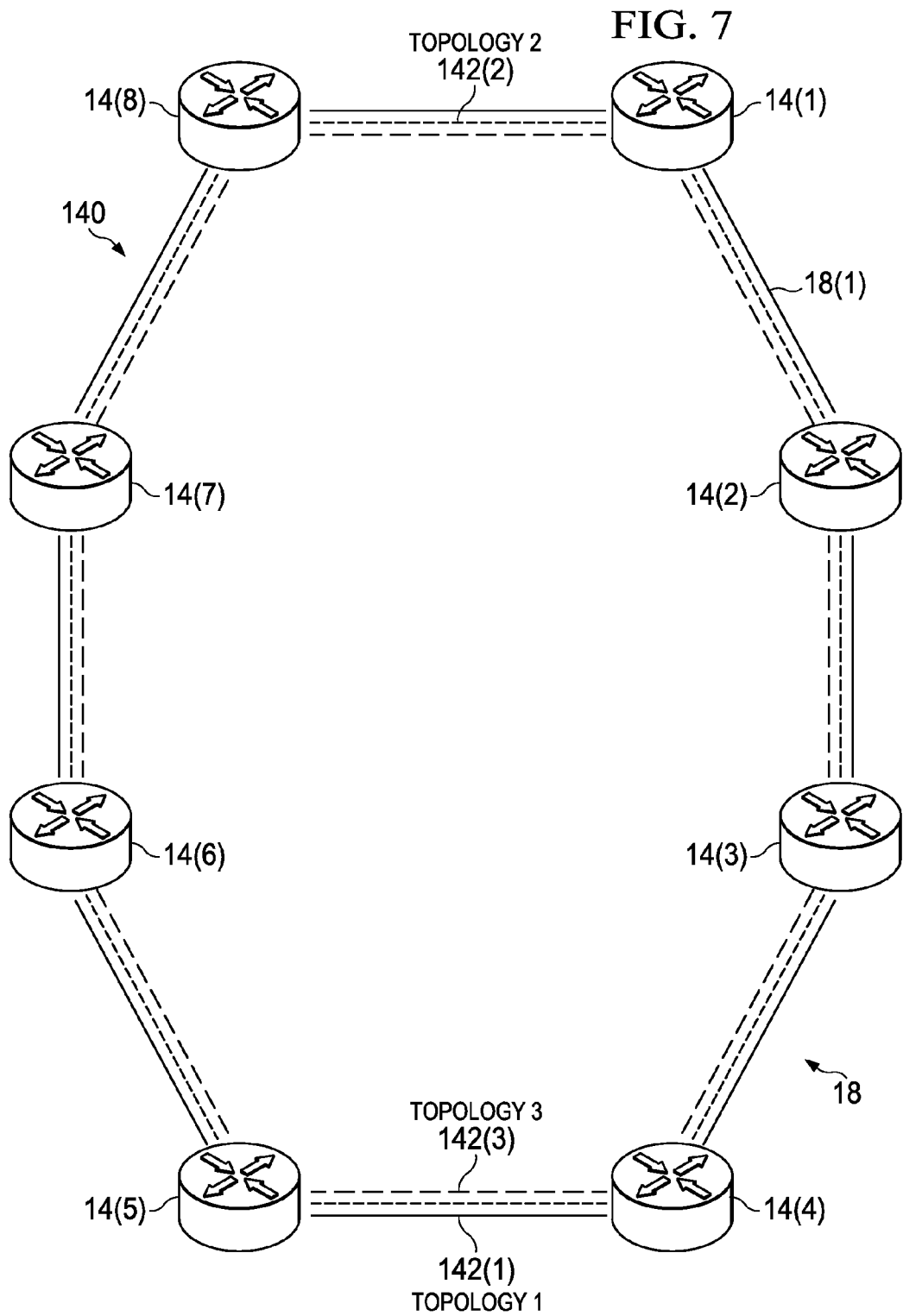
FIG. 7 is a simplified block diagram illustrating another embodiment of the communication system.

Turning to FIG. 7, FIG. 7 is a simplified block diagram illustrating another example embodiment of communication system 10. Routers 14(1)-14(8) may be configured in an example ring topology 140 having 8 nodes connected over links 18. Three non-base (e.g., class-specific) MTR topologies 142(1)-142(3) may be defined for three corresponding subsets (e.g., classes) of traffic to be re-routed in the case of fading of any of links 18. For example, MTR topology 142(1) may correspond to a first class for voice traffic; MTR topology 142(2) may correspond to a second class for data traffic; MTR topology 142(3) may correspond to a third class for video traffic. In addition, a base MTR topology (not shown) may also be configured, wherein the base MTR topology comprises substantially all routers 14(1)-14(8). For example purposes, only three MTR topologies are illustrated herein; any number of MTR topologies may be included in any suitable ring topology within the broad scope of the embodiments. Links 18 may be initially part of all MTR topologies 142(1)-142(3). Substantially all MTR topologies 142(1)-142(3) including the base MTR topology may overlap at steady state, and in the absence of any fading on the ring.

According to the example embodiment of communication system 10, a router (say, router 14(1)) may receive a current bandwidth characteristic for a link (e.g., link 18(1)) determined under fading conditions associated with signal propagation on the link. Router 14(1) may compare the current bandwidth characteristic with a preconfigured "low watermark" (e.g., a relatively lower threshold (e.g., floor) of bandwidth characteristic below which the link may be removed, and above which another action (e.g., cost recalculation) may be performed) corresponding to a class-specific MTR topology (e.g., MTR topology 142(1)) that includes link 18(1). Router 14(1) may remove link 18(1) from MTR topology 142(1) if the bandwidth characteristic is lower than the low watermark. Router 14(1) may re-route the plurality of flows belonging to the class of traffic (e.g., voice traffic) corresponding to MTR topology 142(1) away from link 18(1), while continuing to allow traffic belonging to the other classes through link 18(1) (e.g., according to policy configurations for the other classes).

Router 14(1) may calculate a new cost for link 18(1) that is different from a nominal cost associated with a nominal bandwidth of link 18(1) without fading conditions if the bandwidth characteristic is higher than the low watermark, and route at least a portion of a plurality of flows corresponding to class-specific MTR topology 142(1) away from link 18(1) based, at least in part, on the new cost. In some embodiments, no action relative to link 18(1) may be performed if the bandwidth characteristic is higher than a preconfigured "high watermark" (corresponding to class-specific MTR topology 142(1)) that is higher than the low watermark. The high watermark may refer to a relatively higher threshold (e.g., ceiling) of bandwidth characteristic below which an action (e.g., cost recalculation) may be taken and above which no action related to the link may be performed. In various embodiments, a plurality of low watermarks may be configured corresponding to respective class-specific MTR topologies 142(1)-142(3), each low watermark being different from each other, according to the traffic flows desired by the user. Likewise, in various embodiments, a plurality of high watermarks may be configured corresponding to respective class-specific MTR topologies 142(1)-142(3), each high watermark being different from each other, according to the traffic flows desired by the user.

According to some embodiments, when one of routers 14(1)-14(8), for example router 14(1), is informed of a fading event on corresponding microwave link 18(1), router 14(1) may run a policy engine to evaluate the received bandwidth information against configured thresholds. Based on the evaluation, router 14(1) may remove link 18(1) from one or more MTR topologies 142(1)-142(3), say MTR 142(1). Alternatively, router 14(1) may set a link cost to a maximum value to achieve the same effect. The removal of link 18(1) (or the new cost of link 18(1)) can trigger rerouting of traffic class traversing MTR topology 142(1) upon link fading events (e.g., assuming that each traffic class is mapped to a dedicated MTR topology).

In another embodiment, router 14(1) may adjust the link cost in MTR topology 142(1) up to a point where the fading reaches the low watermark. If the low watermark value is crossed, link 18(1) may be removed from MTR topology 142(1) (and any other affected MTR topology). The operations can trigger incremental re-routing of a specific traffic class away from faded link 18(1) with increase in link degradation level. In some embodiments, the link cost calculation can also factor in the traffic class, thus resulting in different cost adjustments in different MTR topologies with the same amount of bandwidth degradation. When the fading subsides, router 14(1) may restore the link membership or cost in the affected MTR topology 142(1). Above the high watermark, router 14(1) may perform no action related to the link.

Merely for example purposes, assume that the service provider seeks to enforce a policy where the voice traffic continues going over the faded link until the link bandwidth falls to approximately 20% of total bandwidth, which corresponds to 80% degradation, whereas the data traffic is re-routed away from faded link as soon as the link bandwidth falls to approximately 90% of total bandwidth, which corresponds to 10% degradation. The service provider can define two non-base (e.g., class specific) MTR topologies, a first class-specific MTR topology corresponding to voice traffic and a second class specific MTR topology corresponding to data traffic. The policy attribute for the first class-specific MTR topology can specify a first fading threshold (e.g., low watermark) for initiating action as 80% and resultant first action as link cost set to maximum (e.g., equivalent to removing link from the topology), and a second fading threshold (e.g., high watermark) to be the same value as the first fading threshold (e.g., high watermark=low watermark) and the resultant second action to be the same as the first action. The policy attribute for the second class specific MTR topology can specify the first fading threshold (e.g., high watermark) for initiating another action as 90%, and the resultant first action as link cost adjustment as described herein with respect to FIG. 1, and the second fading threshold (e.g., low watermark) for initiating action as 10% and resultant second action as link cost set to maximum (e.g., equivalent to removing link from the topology).

Under normal (e.g., non-fading) conditions, substantially all links 18 may be part of both the first and the second class-specific MTR topologies with link cost being a default value. As link 18(1) starts fading, link 18(1)'s cost and/or membership in the first and/or second class-specific MTR topology can change in accordance with corresponding policy attributes, for example, achieving the desired class specific re-routing. Similarly, as the fading subsides, link 18(1)'s cost and/or membership in the first and/or second class-specific MTR topology may be restored in accordance with the corresponding policy attributes.

Embodiments of communication system 10 can provide a method to achieve class of traffic based selective IGP rerouting on link fading in ring networks with ACM microwave links, through the use of MTR, where a given links membership or link cost in a given topology is determined based on the link's available bandwidth and policy attributes specific to the topology. Embodiments of communication system 10 can provide various advantages, including more granular control over traffic rerouting in response to the link fading event in ring networks with ACM microwave links, and class based load balancing around the ring based on network performance. The mechanisms described herein can also be leveraged to abstract out the MTR configuration aspects, for example, to make feature provisioning more operator friendly. For example, the operator may merely configure the intended traffic classes and the corresponding policy attributes (e.g., fading thresholds, action, etc). Embodiments of communication system 10 can use the configured information to internally create MTR topologies and any further needed configurations.

Figure 8:
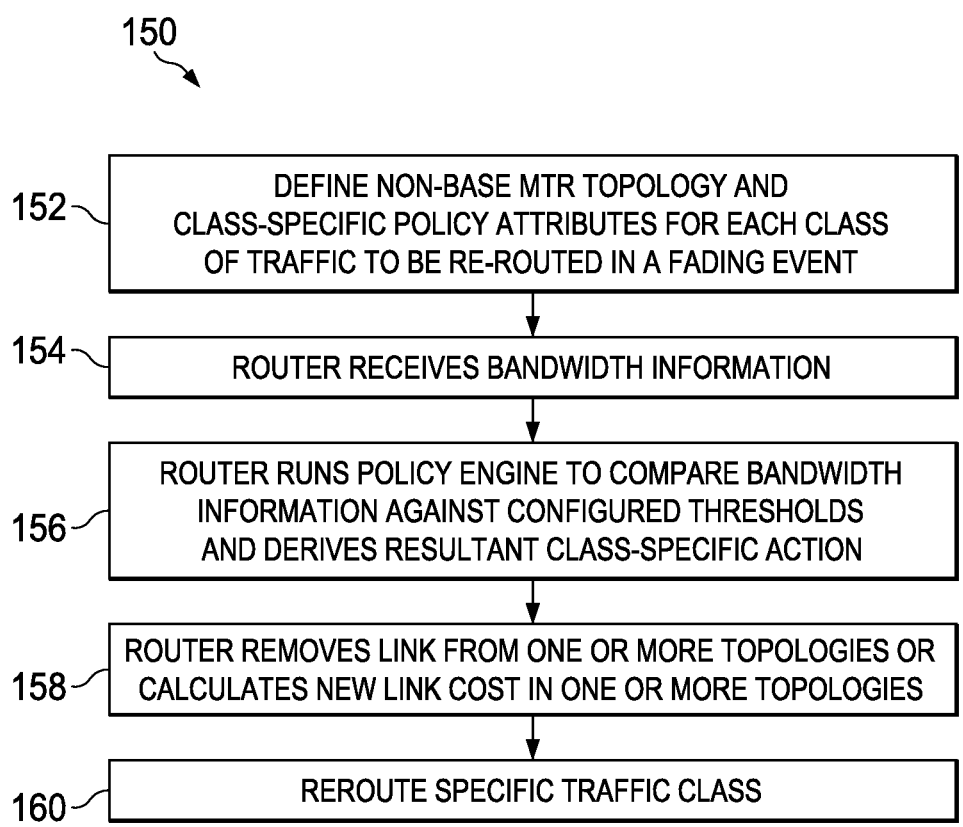
FIG. 8 is a simplified flowchart illustrating other potential example operations that may be associated with embodiments of the communication system.

Turning to FIG. 8, FIG. 8 is a simplified flow diagram illustrating example operations 150 that may be associated with an embodiment of communication system 10. At 152, a non-base MTR topology may be defined (e.g., configured, specified) for each class of traffic to be re-routed in a fading event (if any), along with class specific policy attributes (e.g., fading thresholds, actions, etc.). The class of traffic may be indicated by any suitable information, for example, QoS markings in the packet header (e.g., Ethernet service bit, IP service bit, BSCP service bit, etc.), and a mapping may be established between the class and the corresponding class-specific MTR topology. At 154, router (e.g., 14(1)) may receive bandwidth information (e.g., bandwidth characteristics) of appropriate links (e.g., link 18(1)) from the corresponding microwave transceivers. At 156, router 14(1) may execute a policy engine to compare bandwidth information against configured thresholds (e.g., low watermark and high watermark) and derive the resultant action(s). The policy engine may specify that the link should be removed from the affected MTR topology if the bandwidth is below a specified low watermark level; cost for the link should be recalculated if the bandwidth is between the low watermark level and a specified threshold; and no additional action should be taken (for example, to affect the MTR topology) if the bandwidth is above the threshold.

Figure 9:
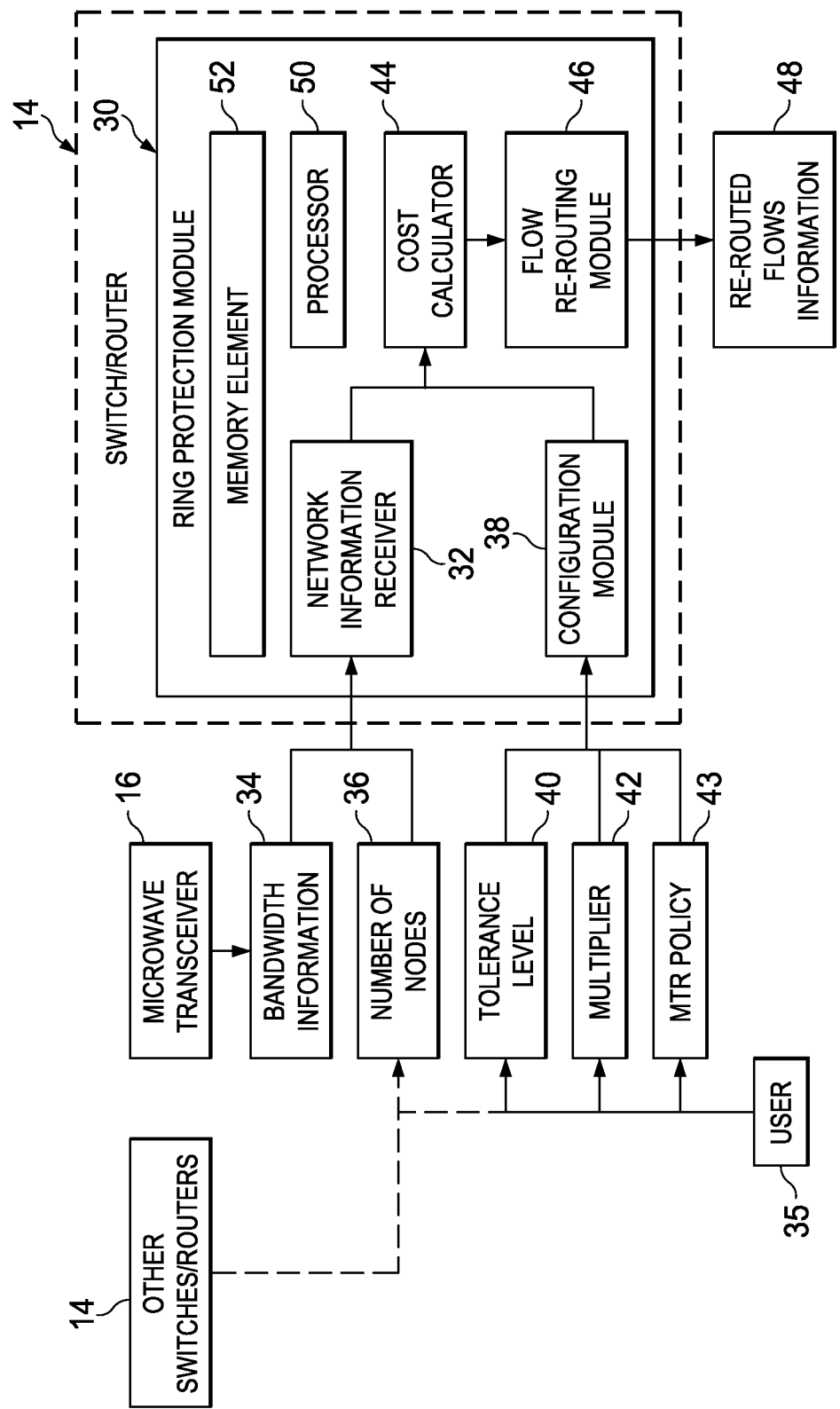
FIG. 9 is a simplified block diagram illustrating example details of an embodiment of the communication system.

Turning to FIG. 9, FIG. 9 is a simplified block diagram illustrating an example embodiment of communication system 10. Example router 14 in an Ethernet ring topology may include ring protection module 30. Network information receiver 32 may receive bandwidth information 34 from example microwave transceiver 16. Network information receiver 32 may also receive information regarding number of nodes 36 from other routers 14 in the ring. Alternately, number of nodes 36 may be obtained from user 35. Configuration module 38 in ring protection module 30 may receive tolerance level (T) 40 and multiplier (L) 42 from user 35. In addition, user 35 may configure a MTR policy 43 in configuration module 38. MTR policy 43 can include information related to classes of traffic associated with specific MTR topologies, bandwidth degradation thresholds, and associated rules.

For example, MTR policy 43 may specify that data class of traffic belongs to MTR topology 142(2), and if the bandwidth of any link in the ring topology falls below 10%, a new cost may be calculated for the link; etc. MTR policy 43 may specify the low watermark and the high threshold between which cost adjustments may be calculated by cost calculator 44. Below the low watermark, the link may be removed from the affected MTR topologies. Above the high threshold, no action (e.g., cost recalculation, flow rerouting, etc.) may be needed. Flow re-routing module 46 in ring protection module 30 may recalculate a shortest path based on the newly calculated cost. Re-routed flows information 48 may be advertised within the ring, or stored appropriately in a routing table based on particular needs. Processor 50 and memory element 52 may facilitate the operations of ring protection module 30.

Figure 10:
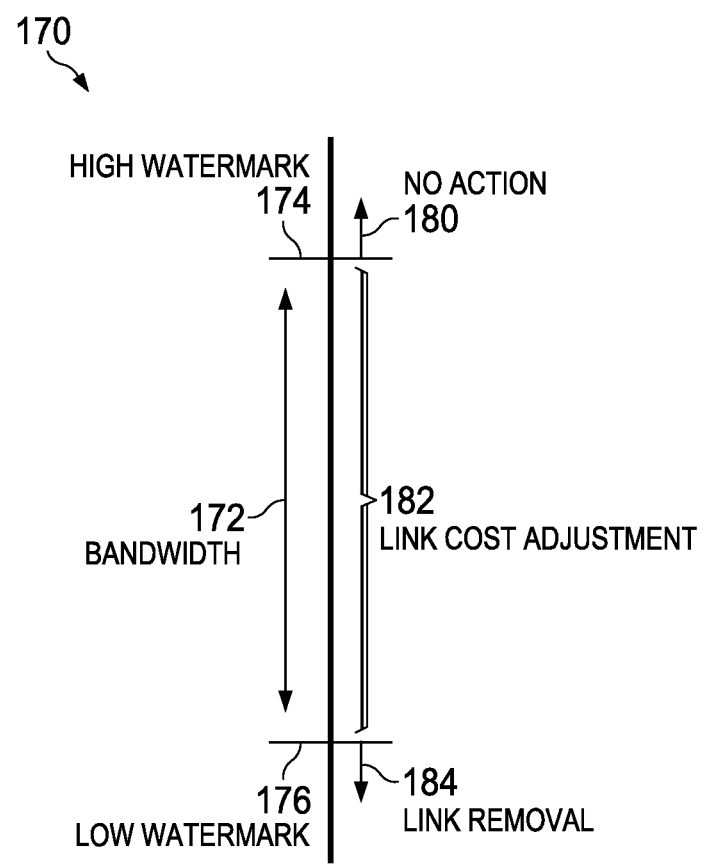
FIG. 10 is a simplified diagram illustrating further example details of an embodiment of the communication system.

Turning to FIG. 10, FIG. 10 is a simplified diagram illustrating example details 170 of an embodiment of the communication system 10. MTR policy 43 for a specific MTR topology (e.g., 142(1)) may indicate actions to be taken according to bandwidth 170 on a link (e.g., 18(1)) in MTR topology 142(1) relative to a high watermark 172, and a low watermark 174. For example, if bandwidth 170 is above high watermark 172, no action 180 relative to link 18(1) in corresponding MTR topology 142(1) may be taken. If bandwidth 170 is between high watermark 172 and low watermark 174, link cost adjustment according to FIG. 1 may be performed on link 18(1). If bandwidth 170 is lower than low watermark 174, link 18(1) may be removed from the MTR topology 142(1).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, routers 14(1)-14(4). In some embodiments, one or more of these features may be implemented in hardware, provided external to these elements, or consolidated in any appropriate manner to achieve the intended functionality. The various network elements (e.g., routers 14(1)-14(4)) may include software (or reciprocating software) that can coordinate in order to achieve the operations as outlined herein. In still other embodiments, these elements may include any suitable algorithms, hardware, software, ware, components, modules, interfaces, or objects that facilitate the operations thereof.

Furthermore, routers 14(1)-14(4) described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some example embodiments, one or more memory elements (e.g., memory element 52) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processor 50) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving a current bandwidth characteristic for a microwave link in a wireless network, the current bandwidth characteristic being determined under fading conditions associated with signal propagation on the microwave link, the current bandwidth characteristic decreasing in discrete steps under the fading conditions according to a microwave modulation scheme;
comparing the current bandwidth characteristic with a preconfigured low watermark corresponding to a class-specific multi-topology routing (MTR) topology associated with a class of traffic traversing the microwave link;
removing the microwave link from the MTR topology if the current bandwidth characteristic is lower than the low watermark;
if the bandwidth characteristic is higher than the low watermark, calculating a new cost for the microwave link for the class of traffic, the new cost being different from a nominal cost associated with a nominal bandwidth of the microwave link without fading conditions; and
routing at least a portion of a plurality of flows of the class of traffic that are to traverse the microwave link away from the microwave link based, at least in part, on the new cost.

2. The method of claim 1, wherein no action relative to the microwave link is performed if the current bandwidth characteristic is higher than a preconfigured high watermark for the class-specific MTR topology, the high watermark being higher than the low watermark.

3. The method of claim 2, wherein a plurality of different high watermarks are configured corresponding to respective class-specific MTR topologies.

4. The method of claim 2, further comprising adjusting a link cost of the microwave link when the current bandwidth characteristic is between the low watermark and the high watermark.

5. The method of claim 1, further comprising routing substantially all flows of the class of traffic away from the microwave link.

6. The method of claim 1, wherein a plurality of different low watermarks are configured corresponding to respective class-specific MTR topologies.

7. The method of claim 6, wherein the plurality of different low watermarks are configured according to traffic flows appropriate for different classes of traffic.

8. The method of claim 1, wherein voice belongs to a first class of traffic, data belongs to a second class of traffic, and video belongs to a third class of traffic.

9. The method of claim 1, wherein the microwave link is removed from the MTR topology corresponding to a first class of traffic, wherein the microwave link is not removed from another MTR topology corresponding to a different second class of traffic.

10. The method of claim 1, further comprising calculating new routes for traffic traversing the MTR topology when the microwave link is removed from the MTR topology.

11. One or more non-transitory media, which encodes logic that includes instructions for execution, which when executed by a processor is operable to perform operations, comprising:
   receiving a current bandwidth characteristic for a microwave link in a wireless network, the current bandwidth characteristic being determined under fading conditions associated with signal propagation on the microwave link, the current bandwidth characteristic decreasing in discrete steps under the fading conditions according to a microwave modulation scheme;
   comparing the current bandwidth characteristic with a preconfigured low watermark corresponding to a class-specific MTR topology associated with a class of traffic traversing the microwave link;
   removing the microwave link from the MTR topology if the current bandwidth characteristic is lower than the low watermark;
   if the bandwidth characteristic is higher than the low watermark, calculating a new cost for the microwave link for the class of traffic, the new cost being different from a nominal cost associated with a nominal bandwidth of the microwave link without fading conditions; and
   routing at least a portion of a plurality of flows of the class of traffic that are to traverse the microwave link away from the microwave link based, at least in part, on the new cost.

12. The media of claim 11, wherein no action relative to the microwave link is performed if the current bandwidth characteristic is higher than a preconfigured high watermark for the class-specific MTR topology, the high watermark being higher than the low watermark.

13. The media of claim 11, wherein the operations further comprise routing substantially all flows of the class of traffic away from the microwave link.

14. The media of claim 11, wherein a plurality of different low watermarks are configured corresponding to respective class-specific MTR topologies.

15. The media of claim 11, wherein the microwave link is removed from the MTR topology corresponding to a first class of traffic, wherein the microwave link is not removed from another MTR topology corresponding to a different second class of traffic.

16. The apparatus of claim 11, wherein the microwave link is removed from the MTR topology corresponding to a first class of traffic, wherein the microwave link is not removed from another MTR topology corresponding to a different second class of traffic.

17. The apparatus of claim 11, further configured for calculating new routes for traffic traversing the MTR topology when the microwave link is removed from the MTR topology.

18. An apparatus, comprising:
   a memory element configured to store instructions;
   a processor coupled to the memory; and
   a ring protection module, wherein the processor is operable to execute the instructions such that the apparatus is configured for:
      receiving a current bandwidth characteristic for a microwave link in a wireless network, the current bandwidth characteristic being determined under fading conditions associated with signal propagation on the microwave link, the current bandwidth characteristic decreasing in discrete steps under the fading conditions according to a microwave modulation scheme;
      comparing the current bandwidth characteristic with a preconfigured low watermark corresponding to a class-specific MTR topology associated with a class of traffic traversing the microwave link;
      removing the microwave link from the MTR topology if the current bandwidth characteristic is lower than the low watermark;
   if the bandwidth characteristic is higher than the low watermark, calculating a new cost for the microwave link for the class of traffic, the new cost being different from a nominal cost associated with a nominal bandwidth of the microwave link without fading conditions; and
   routing at least a portion of a plurality of flows of the class of traffic that are to traverse the microwave link away from the microwave link based, at least in part, on the new cost.

19. The apparatus of claim 18, wherein no action relative to the microwave link is performed if the current bandwidth characteristic is higher than a preconfigured high watermark for the class-specific MTR topology, the high watermark being higher than the low watermark.

20. The apparatus of claim 18, further configured for routing substantially all flows of the class of traffic away from the microwave link.

21. The apparatus of claim 18, wherein a plurality of different low watermarks are configured corresponding to respective class-specific MTR topologies.

* * * * *